Feb. 21, 1933.  J. B. WALKER  1,898,471
CAMERA
Filed Sept. 21, 1929
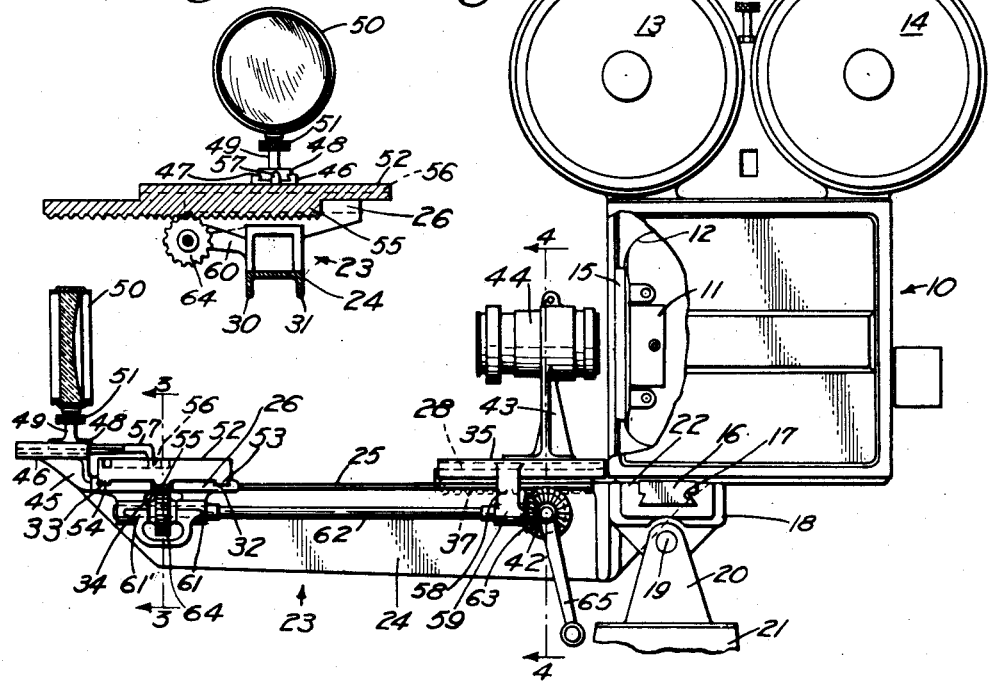
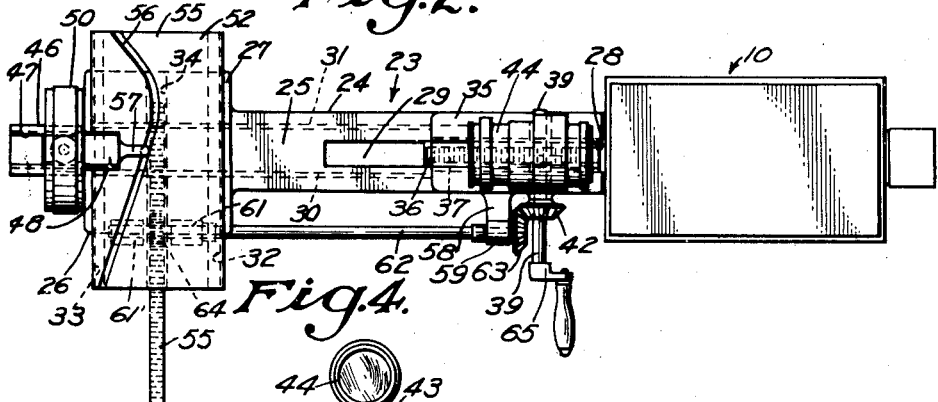
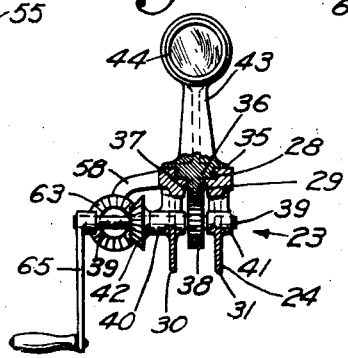
INVENTOR:
Joseph B. Walker,
BY
ATTORNEY.

Patented Feb. 21, 1933

1,898,471

UNITED STATES PATENT OFFICE

JOSEPH B. WALKER, OF LOS ANGELES, CALIFORNIA

CAMERA

Application filed September 21, 1929. Serial No. 394,259.

The present invention relates to cameras, and particularly to improvements in cameras adapted for photography in the motion picture art.

The principal object of the invention is to provide an attachment for cameras of the character described by which either long distance or close-up views may be taken by the same camera by the simple movement of a single crank.

In this art it is often desirable to take a picture in which the scene taken appears at a considerable distance from the camera, and to rapidly change the adjustment of the camera while the same is in operation so that portions of this scene may be shown as if they were much closer to the spectator, giving the appearance of objects moving towards or away from the camera, or vice versa. Heretofore, this has been accomplished by moving the camera toward or away from the objects being photographed and simultaneously changing the focus.

The chief difficulty encountered heretofore has been in the method of making both medium shots and close-ups from a single set-up, or placement of the camera.

When ordinary scenes are photographed for silent moving pictures, each shot is made separately. That is, the camera is placed say twenty feet away from the player to be photographed or shot, with all "spots", "lamps", and screens carefully arranged to suit the camera operator, so that the player is lighted exactly right as long as he stays in the circumscribed area. Then when a close-up is to be taken of the same action, a complete readjustment is necessary. The camera is moved perhaps ten feet closer, and all lights and impediments must be changed to correspond.

When talking moving pictures are made, both shots are made simultaneously, two cameras of course being necessary. One camera is focused at twenty feet and the other at ten, the additional feet required for the close-up being taken care of by a telescopic lens which obtains approximately the same result as moving up the camera would.

A further object of the present invention is to provide a camera attachment having means by which the degree of magnification may be rapidly changed and wherein the objects to be photographed are kept in focus regardless of the degree of magnification.

Another object of the present invention is to provide a camera attachment having means for changing the size of the image while operating the camera and means for keeping the image always in focus.

Still another object of the present invention is to provide a camera attachment embodying means for changing the relative positions of the lens systems, so as to vary the size of the image formed thereby, and at the same time keeping the lens systems in the proper relative positions so that the image on the film is in focus.

Another object of the present invention is to provide means for automatically adjusting the lens systems while the camera is in operation.

A further object of the present invention is to provide means whereby the distance between the primary and secondary systems of lenses can be automatically maintained for varying degrees of magnification.

A still further object of the present invention is to provide means for automatically adjusting the camera shutter opening or diaphragm opening to compensate for differences of exposure due to changes of magnification.

For the better explanation of my invention, reference is made to the accompanying drawing forming a part of this specification, illustrating means for carrying into effect my said invention in which:

Fig. 1 is a side elevation of the improved camera with a portion of the frame broken away and in section to show the adjustable camera mounting and the film movement mechanism.

Fig. 2 is a top plan view of the same.

Fig. 3 is a section taken on the line 3—3 of Fig. 1, illustrating the mounting of the supplemental lens and a part of the adjustment mechanism therefor.

Fig. 4 is a section taken on the line 4—4 of Fig. 1, illustrating the mounting of the ordinary lens system and the adjustment mechanism therefor.

For the sake of simplicity only single supplemental and ordinary lens systems are shown in the drawing, but the scope of the invention includes as well any composite lens elements.

The invention is capable of receiving a variety of modified expressions, but it is to be expressly understood that the drawing is for the purpose of illustration only and are not to be construed as a definition of the limits of the invention, reference being had to the appended claims for that purpose.

In the views, 10 designates a moving picture camera box which in the conventional manner houses the movement mechanism 11 for a film 12. The film 12 is fed from and wound upon reels disposed within magazines 13 and 14 mounted on the top of the camera box 10. Likewise a shutter 15 of conventional construction is arranged in the camera box 10 forwardly of the film 12 and the film movement mechanism 11. Attached to and extending transversely across the forward end of the base of the camera box 10 is a guide bar 16 of dovetail configuration in cross section. The guide bar 16 is slidably mounted in a dovetail slot 17 of corresponding shape formed in a camera rest element 18, the lower end of which has a pin connection 19 with leg portions 20 of a revoluble head 21 of a supporting tripod, not illustrated. The construction so far described is common to present moving picture cameras.

Connected to the guide bar 16 by an extension 22 is a lens rest 23 in the form of a bracket 24. The bracket 24 is preferably constructed of some relatively light-weight material such as aluminum and has a track portion 25 which terminates in an enlarged end portion 26 of square configuration having a flat upper surface 27.

The portion 25 which will hereinafter be designated as the primary track means of the invention is provided with a horizontally extending slot 28 of dovetail configuration in cross section which communicates with a smaller vertical slot 29 extending entirely through the medial part of said bracket adjacent one end. The lower surface of the track portion 25 is formed on its opposite edges with depending flanges 30 and 31.

The enlarged square end 26 of the bracket 24 is relatively thicker than the track portion 25 and is provided adjacent each of its transverse edges with guide grooves 32 and 33 of dovetail configuration in cross section. Intermediate the grooves 32 and 33 the square end 26 is formed with a transverse slot 34 which extends entirely therethrough.

Slidably mounted on the primary track means is a plate 35 having a dovetail guide rail 36 disposed on its lower surface, this guide rail 36 fitting within and adapted for movement in the slot 28 of said bracket. Formed on the lower surface of the guide rail 36 is a rack 37 which is adapted for meshing engagement with a gear 38 suitably keyed on a shaft 39 and positioned between the flanges 30 and 31. The shaft 39 is journalled in bosses 40 and 41 formed on the depending flanges 30 and 31 of the bracket 24 and has keyed adjacent one end a beveled gear 42, said shaft 39 extending outwardly beyond said gear 42.

Connected to the plate 35 and extending upwardly therefrom is a standard 43 in which is adjustably mounted a primary lens system 44, to be hereinafter described. Connected to and extending forwardly from the extreme outer end of the enlarged portion 26 is an upwardly disposed arm 45 having a relatively thick upper surface 46. The surface 46 of the arm 45 is formed with a horizontally extending dovetail slot 47 providing the secondary track means of the invention and on which is slidably mounted a dovetail guide bar 48 carrying a tubular standard 49. A secondary lens system 50 is mounted on the upper end of the standard 49 and said lens system 50 is adapted for adjustment on the standard 49 by means of a nut 51.

A cam plate 52 is provided on its lower surface and adjacent its transverse edges with dove-tail guide bars 53 and 54 which fit within the dovetail guide grooves 32 and 33 of the end portion 26 which comprises the auxiliary track means of the invention. The cam plate 52 is adjustable along the auxiliarly track means transversely across the enlarged end 26 of the bracket 24 and carries on its lower surface a centrally disposed rack 55. A cam groove 56 is formed in the upper face of the plate 52 and is adapted to receive the bent over finger element 57 connected to the guide bar 48 which carries the standard 49 and consequently the secondary lens system 50.

Extending downwardly and outwardly from the rail portion 25 of the bracket 24 is an arm 58 on the lower end of which is formed a boss 59.

Formed on the outer end of the bracket 24 and to one side and below the end portion 26 is an arm 60 formed with spaced apart bosses 61 and 61'. Journalled in the bosses 59, 61, and 61' of the arms 58 and 60 is a shaft 62, and suitably keyed on the opposite ends of the shaft 62 is a beveled gear 63 and a spur gear 64. The beveled gear 63 meshes with the beveled gear 42 on the shaft 39, while the spur gear 64 meshes with the rack 55 on the plate 52. Mounted on the outer end of the shaft 39 is a crank 65 adapted for manual operation to rotate the shaft 39.

As the crank 65 is actuated, motion is imparted through the shaft 39 and the gear 38 to the rack 37, causing the primary lens system 44 to be advanced and retracted along the primary track means relative to the camera 10. Simultaneously the beveled gear 42 on the shaft 39 is rotated, and as it is in mesh with the beveled gear 63 on the shaft 62, the latter revolves and imparts motion to the spur gear 64 and the rack 55 on the plate 52. Consequently the plate 52 is capable of movement transversely in opposite directions on the auxiliary track means of the enlarged portion 26 of the bracket 24. As the crank 65 is operated, the primary lens system 44 may be advanced to or from the focal plane of the camera, and simultaneously the secondary lens system 50, by reason of its finger connection 57 with the cam groove 56, will be moved on the secondary track means relatively to the primary lens system 44.

As heretofore stated, the invention in conjunction with a camera is particularly adapted for taking pictures in which the scene taken appears at a considerable distance from the camera and to rapidly change the adjustment of the camera while the film movement mechanism is in operation, so that portions of this scene may be shown as if they were much closer to the spectator, giving the appearance of the objects moving towards or away from the camera, or vice versa.

By automatically adjusting the lens systems as above described, the degree of magnification may be rapidly changed and the objects in the scene are kept in focus regardless of the degree of magnification.

In this manner the secondary lens system 50, by reason of its cam adjustment, tends to change the effective distance of the camera from the object being photographed.

By operating the crank 65 during the operation of the camera, the primary lens system 44 is moved toward or away from the camera, and the secondary lens system 50 is simultaneously moved so as to maintain focus at all times.

I have discovered by experiment with actual lenses that the shape of the cam groove on the plate 52 depends upon the characteristic of the lens and to a certain degree upon the change in distance; that is to say, if the effective distance to the center of the picture is 25 feet, the shape of the cam slot 56 is somewhat different than it would be if it was desired to change from an effective distance of 75 feet to an effective distance of 30 feet.

By providing the cam plate 52 separate from the enlarged portion 26 at the end of the bracket 24 it may be readily removed, and it is possible to utilize separate cam plates having different shaped cam grooves for the same system of lenses and in this manner insure a proper focus at all times.

I claim:

1. In combination, a camera, primary lens means and secondary lens means movable along the focal axis of the camera, operating means for moving one lens, a cam guide disposed in a plane at an angle to the focal axis, a cam detachably carried by said guide, means for moving said cam from said operating means, and an operating connection between said cam and the other lens for moving said other lens as the cam is moved on its guide.

2. In a camera lens system, a primary lens, a secondary lens, means for moving said primary lens along its focal axis, means for moving said secondary lens along its focal axis as the primary lens is moved, and said last named means including a cam support adapted to carry any of a number of cams for moving the secondary lens to different positions with respect to the primary lens, and a cam on said support.

In testimony whereof, I have hereunto set my hand at Los Angeles, California, this 14th day of September, 1929.

JOSEPH B. WALKER.